United States Patent
Hayden

(10) Patent No.: US 7,734,274 B2
(45) Date of Patent: Jun. 8, 2010

(54) NARROW-BAND DETECTIONS OF A RECEIVED SIGNAL

(75) Inventor: Douglas Todd Hayden, Boise, ID (US)

(73) Assignee: Preco Electronics, Inc., Boise, ID (US)

( * ) Notice: Subject to any disclaimer, the term of this patent is extended or adjusted under 35 U.S.C. 154(b) by 1024 days.

(21) Appl. No.: 11/425,052

(22) Filed: Jun. 19, 2006

(65) Prior Publication Data

US 2007/0293174 A1    Dec. 20, 2007

Related U.S. Application Data

(60) Provisional application No. 60/805,054, filed on Jun. 16, 2006.

(51) Int. Cl.
   *H04B 1/16* (2006.01)
(52) U.S. Cl. .................. 455/340; 455/339; 455/334; 455/192.1; 455/192.2; 455/296; 375/229; 375/232; 375/343; 375/344; 375/346; 375/350
(58) Field of Classification Search ... 455/192.1–192.2, 455/161.1–161.3, 168.1, 188.1–188.2, 189.1, 455/190.1–190.2, 205, 213, 334, 339–340, 455/296; 375/219, 229–232, 340, 343–344, 375/346, 350
   See application file for complete search history.

(56) References Cited

U.S. PATENT DOCUMENTS

| | | | |
|---|---|---|---|
| 4,868,868 A * | 9/1989 | Yazu et al. | 704/205 |
| 5,257,292 A | 10/1993 | Sauvagerd et al. | |
| 5,323,391 A * | 6/1994 | Harrison | 370/210 |
| 5,345,471 A | 9/1994 | McEwan | |
| 5,523,760 A | 6/1996 | McEwan | |
| 5,815,529 A | 9/1998 | Wang | |
| 6,134,268 A * | 10/2000 | McCoy | 375/229 |
| 6,141,372 A * | 10/2000 | Chalmers | 375/147 |
| 6,314,147 B1 | 11/2001 | Liang et al. | |
| 6,470,047 B1 | 10/2002 | Kleinerman et al. | |
| 6,996,188 B2 * | 2/2006 | McCoy | 375/260 |

OTHER PUBLICATIONS

International Search Report PCT/US06/23709, Apr. 2005.

* cited by examiner

*Primary Examiner*—Tuan A Tran
(74) *Attorney, Agent, or Firm*—Townsend and Townsend and Crew LLP; Kenneth R. Allen

(57) ABSTRACT

The frequency of an RF signal to be transmitted is modulated at the transmitting unit, and the modulation information is used by the receiving unit to filter out any unwanted noise. The modulation information may be used to retrieve associated filter coefficients that are used by the receiver to filter out the noise. Accordingly, for each transmit frequency, a multitude of filter coefficients stored in a memory are applied by the receiver to filter out the noise. The filtering operation may be performed after the received signal is downconverted from an RF to an audio signal.

28 Claims, 5 Drawing Sheets

US 7,734,274 B2

NARROW-BAND DETECTIONS OF A RECEIVED SIGNAL

CROSS-REFERENCES TO RELATED APPLICATIONS

The present application claims benefit under 35 USC 119 (e) of U.S. provisional application No. 60/805,054, filed Jun. 16, 2006, entitled "Narrow-Band Detections Of A Received Signal," the content of which is incorporated herein by reference in its entirety. The present invention is also related to co-pending U.S. application Ser. No. 11/278,936, filed Apr. 6, 2006, entitled "Modulation of an RF Transmit Signal," the content of which is incorporated herein by reference in its entirety.

BACKGROUND OF THE INVENTION

In high-frequency electronic circuits, there is often a need to change the frequency of the transmit signal, i.e., to shift from one frequency to another, in order to prevent interference to and from other RF transceiver units or other sources of noise. Such frequency shifting may be achieved by varying the bias applied to a varactor diode, that in turn, changes the capacitance values disposed in a crystal oscillator circuit.

At the receiving end, a synchronous sampler, such as used in a microwave impulse radar (MIR), is used to downconvert the received RF signal to an audio frequency signal by a scale factor. For example, to convert a transmitted RF signal having a frequency of 6.5 GHz, to an audio signal having a frequency of 5.000 KHz, a scaling factor of 1,300,000 is used. Transmitter 10 of FIG. 1 transmits an RF signal TX_RF, which is received by receiver 20 having disposed therein synchronous sampler 12. All synchronous signals that are received by synchronous sampler 12 are converted and combined into a composite audio signal, RX_audio, by the same scaling factor.

FIG. 2 shows a frequency spectrum of received signals 25 and 30 having respective center frequencies of 6.50 GHz and 6.510 GHz. Signal 30 represents a noise signal that is also received by receiver 20. Assuming a scaling factor of 1,300, 000, the downconverted audio signal corresponding to noise signal 30 has a frequency of 5.008 KHz. FIG. 3 shows the frequency spectrum of downconverted audio signals 35 and 40, respectively corresponding to RF signals 25 and 30. To attenuate audio noise signal 40, while allowing received RF signal 35 to pass at the receiving end, a bandpass having a frequency characteristics shown with dashed line 45 is used.

BRIEF SUMMARY OF THE INVENTION

In accordance with one embodiment of the present invention, the frequency of an RF signal to be transmitted is modulated at the transmitting unit, and the modulation information is used by the receiving unit to filter out any received noise. In one embodiment, the modulation information is used to retrieve associated filter coefficients that are used by the receiver to filter out the noise. Accordingly, for each transmit frequency, a multitude of filter coefficients stored in a memory are applied by the receiver to filter out the noise, as described further below. In one embodiment, the filtering operation is performed after the received signal is downconverted from an RF to an audio signal. In another embodiment, the filtering operation is performed before the received RF signal is downconverted to an audio signal.

In one embodiment, to determine if some amount of shift is required by the transmitted signal, the RF transmitter is periodically turned off to enable the receiver to determine the spectrum of the RF noise signals. The data associated with the determined noise spectrum is subsequently supplied to the transmitter and receiver which use this data to select the amount of frequency shift in the transmitter and receiver filtering. In another embodiment, the frequency of the RF signal to be transmitted is varied in accordance with a predefined algorithm that is known by both the transmitter and receiver.

DETAILED DESCRIPTION OF THE INVENTION

In accordance with one embodiment of the present invention, the frequency of an RF signal to be transmitted is modulated at the transmitting unit, and the modulation information is used by the receiving unit to filter out any received noise. In one embodiment, the modulation information is used to retrieve associated filter coefficients that are used by the receive to filter out the noise. Accordingly, for each transmit frequency, a multitude of filter coefficients stored in a memory are applied by the receiver to filter out the noise, as described further below. In one embodiment, the filtering operation is performed after the received signal is downconverted from an RF to an audio signal.

Figure 1:
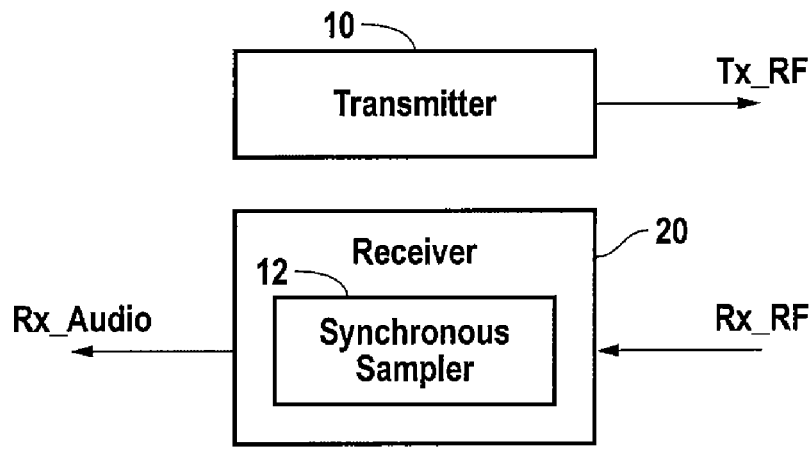
FIG. 1 is a block diagram of a system, as known in the prior art.
Figure 2:
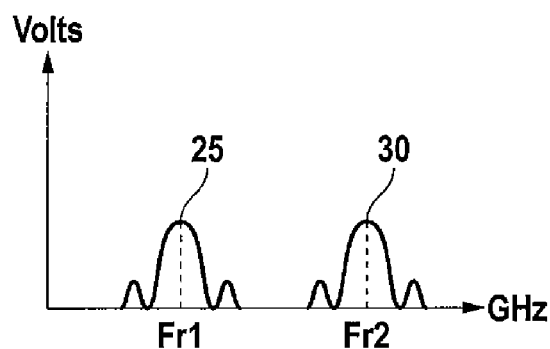
FIG. 2 shows a frequency spectrum of a transmitted RF signal and a noise signal received via a receiver, as known in the prior art.
Figure 3:
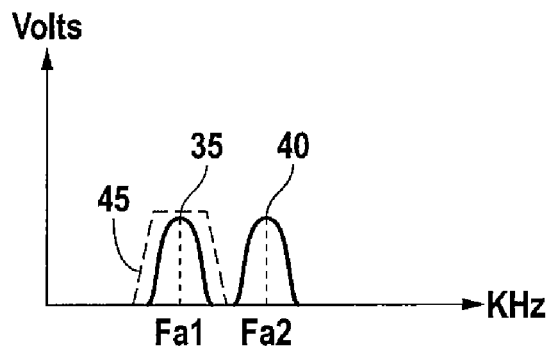
FIG. 3 shows a frequency spectrum of down converted audio signals corresponding to the signals shown in FIG. 2.
Figure 4:
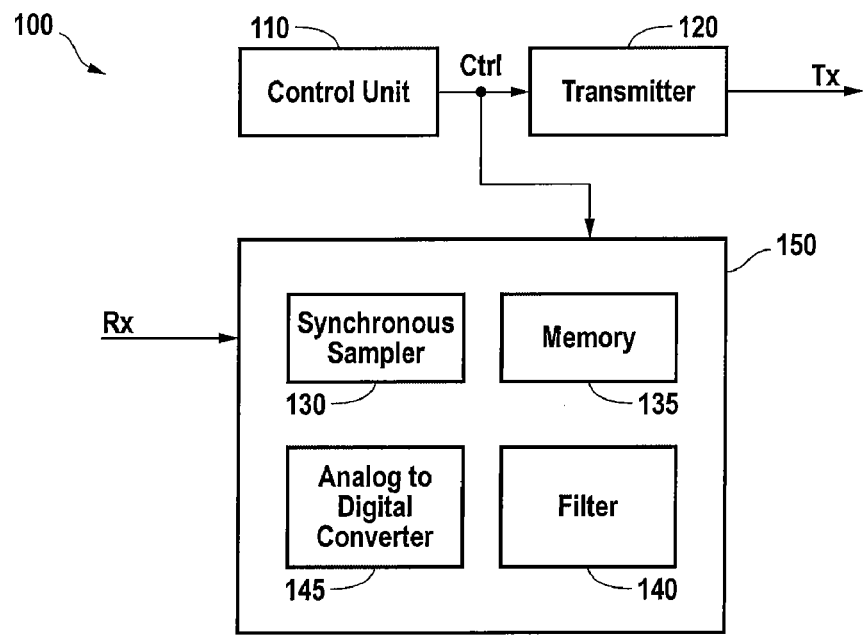
FIG. 4 shows a transmitter/receiver system, in accordance with one embodiment of the present invention.

FIG. 4 shows a system 100, in accordance with one embodiment of the present invention. System 100 is shown as including, in part, a transmitter 120, a receiver 150, and a control unit 110. Receiver 150 is shown as including, in part, a synchronous sampler 130, a memory 135, a filter 140, and an analog-to-digital converter 145. Signal Ctrl generated by control unit 110 is used to modulate the frequency of the RF signal Tx transmitted by transmitter 120, as described in co-pending U.S. application Ser. No. 11/278,936, filed Apr. 6, 2006, entitled "Modulation of an RF Transmit Signal", the contents of which is incorporated herein by reference in its entirety.

Synchronous sampler 130, also known as mixer, of receiver 150 receives RF signal Rx that may include both the transmitted RF signal as well as any other synchronous RF noise. The analog RF signals so received are downconverted to corresponding audio frequency signals by synchronous sampler 130. Synchronous sampler 130 is described in U.S. Pat. Nos. 5,523,760, and 5,345,471, the contents of both of which are incorporated herein by reference in their entirety. The downconverted audio frequency signals are further converted to digital signals by analog-to-digital converter 145.

In accordance with one embodiment, associated with each transmit frequency, is a set of filter coefficients stored in memory 135 and that are used by filter 140 to filter out the noise. Accordingly, as signal Ctrl is varied to shift the frequency of the transmitted signal, a new address in memory 135 is accessed to retrieve a different set of filter coefficients associated with the new value of signal Ctrl.

Filter 140 applies the set of filter coefficients so retrieved from memory 135 to the digital audio signals it receives from analog-to-digital converter 145 to filter out the noise components of the received signals using digital filtering techniques such as finite impulse response or infinite impulse response filters. In other words, since the down converted audio signal can have multiple frequency components, applying a frequency dependent filter to the audio signals allows only the desired audio frequency components to pass, as described above, so as to, for example, enable target detection. Consequently, in accordance with the present invention, the filtering operation is carried out dynamically to track the frequency of the transmitted signal. Hence, filter coefficients in memory 135 enable the frequency characteristics of filter 140 to vary dynamically and in conformity with the shift in the frequency of the transmitted signal. Filter 140 may be a band pass, etc.

Figure 5A:
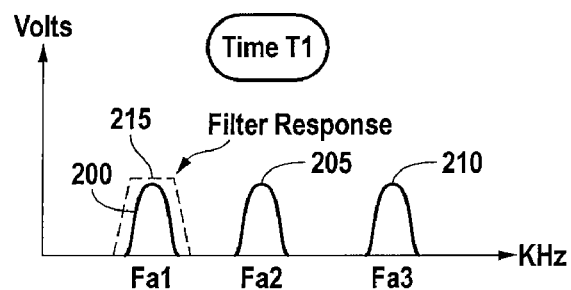
FIGS. 5A and 5B show, in part, the spectrum of a down converted audio signal before and after a frequency shift, in accordance with one embodiment of the present invention.

FIG. 5A shows an exemplary frequency spectrum of the down converted received signal 200 which is the transmitted signal target reflection, as well as noise signals 205, and 210 at time T1. To filter out noise signals 205, and 210, associated filter coefficients stored in memory 135 representing the corresponding scaled frequency of the transmitted signal, cause filter 140 to have the filter characteristic shown with the dashed line 215. Accordingly, noise components 205 and 210 are filtered out.

Figure 5B:
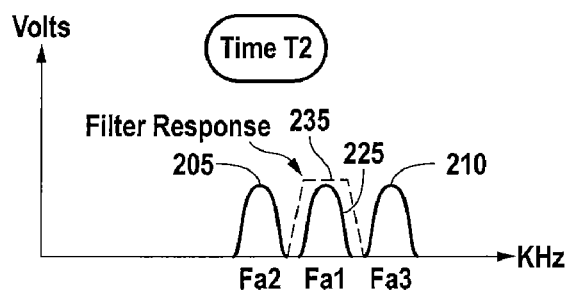

FIG. 5B shows the exemplary frequency spectrum shown in FIG. 5A following a shift in the transmit frequency and the corresponding shift in the down converted received signal which is a reflection of the transmitted signal, from 200 at time T1, to 225 at time T2. To filter out noise signals 205, and 210, associated filter coefficients stored in memory 135 representing the frequency of the transmitted signal, cause filter 140 to have the filter characteristic shown with the dashed line 235. Accordingly, noise components 205 and 210 are filtered.

In accordance with another embodiment, associated with each transmit frequency, is a different sampling rate for use by the digital-to-analog converter 145 and stored in memory 135. In such embodiments, the digital filter coefficients remain fixed, whereas the sampling rate of the digital-to-analog converter 145 is varied in accordance with the shift in the frequency of the transmitted signal to modify the frequency response of filter 140. Accordingly, as signal Ctrl is varied to shift the frequency of the transmitted signal, a new address in memory 135 is accessed to retrieve a different analog-to-digital sampling rate associated with the new value of signal Ctrl. The technique for modifying the filter frequency response by changing the digitizer sampling rate is described in an article entitled "Timer controls DSP-filter frequency resolution", by Douglas Todd Hayden, published by EDN magazine, the content of which is incorporated herein by reference in its entirety.

Filter 140 applies the set of filter coefficients so retrieved from memory 135 to the digital audio signals it receives from analog-to-digital converter 145 to filter out the noise components of the received signals. In other words, since the down converted audio signal can have multiple frequency components, applying a frequency dependent filter to the audio signals allows only the desired audio frequency components to pass, as described above, so as to, for example, enable target detection. Consequently, in accordance with the present invention, the filtering operation is carried out dynamically to track the frequency of the transmitted signal. Hence, filter coefficients in memory 135 enable the frequency characteristics of filter 140 to vary dynamically and in conformity with the shift in the frequency of the transmitted signal. Filter 140 may be a band pass, etc.

In one embodiment, to select the amount of shift of the transmitted signal, transmitter 110 is periodically turned off to enable the receiver 150 determine the spectrum of the received RF noise signals. The data associated with the determined noise spectrum is subsequently supplied to the transmitter 120 or controller 110, which use this data to select the amount by which to shift the frequency of the transmitted signal.

Figure 6:
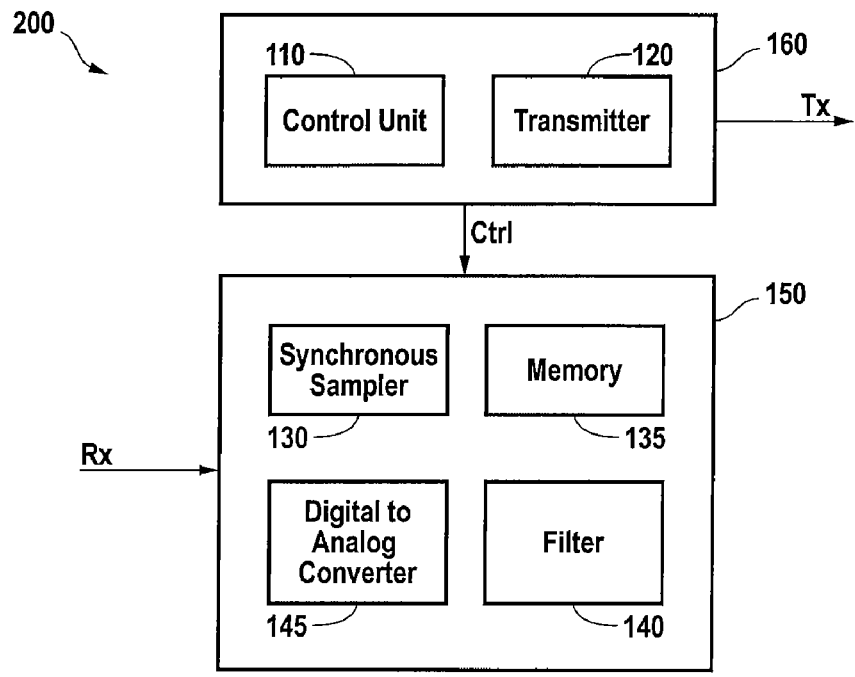
FIG. 6 shows a transmitter/receiver system, in accordance with another embodiment of the present invention.

FIG. 6 shows a system 200, in accordance with one embodiment of the present invention. System 200 is similar to system 100 except that in system 200, control unit 110 and transmitter 120 are disposed in the same block 160. Signal Ctrl generated within block 160 is used to modulate the frequency of the RF transmitted signal Tx. Signal Ctrl is used by receiver 150 to retrieve a different set of filter coefficients associated with the new frequency of transmission.

Figure 7:
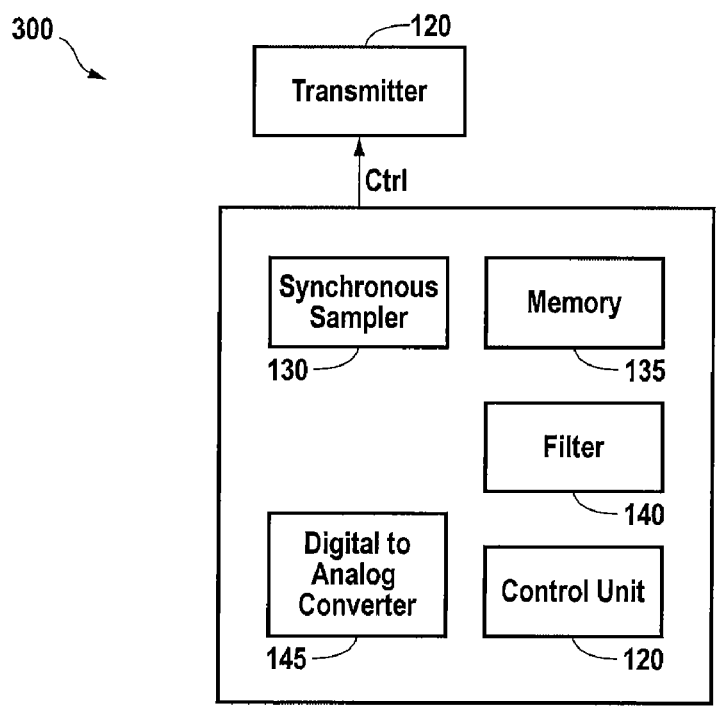
FIG. 7 shows a transmitter/receiver system, in accordance with another embodiment of the present invention.

FIG. 7 shows a system 300, in accordance with one embodiment of the present invention. System 300 is similar to system 100 except that in system 300, control unit 110 is disposed in the receiver 150. Signal Ctrl generated by control unit 120 is used by transmitter 120 to modulate the frequency of the RF transmitted signal Tx. Signal Ctrl is used by receiver 150 to retrieve a different set of filter coefficients associated with the new frequency of transmission.

Figure 8:
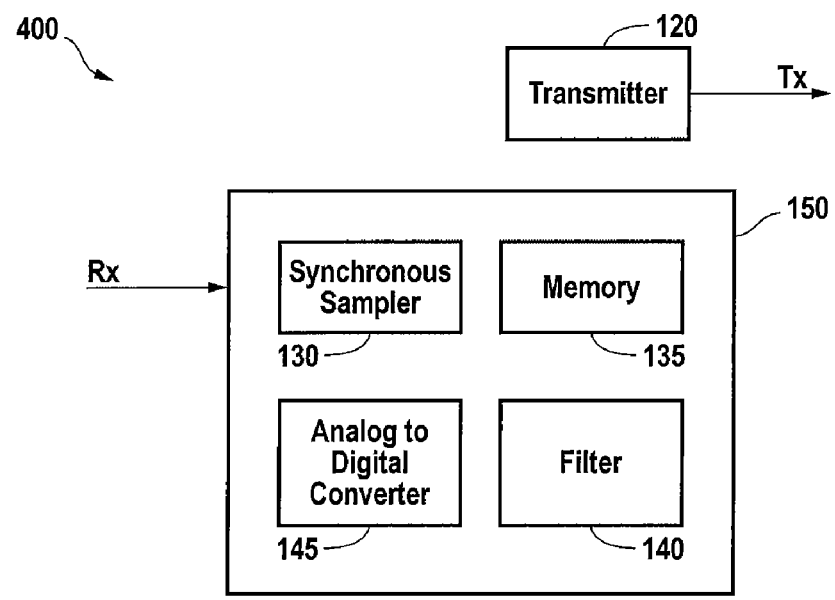
FIG. 8 shows a transmitter/receiver system, in accordance with another embodiment of the present invention.

In another exemplary embodiment 400 shown in FIG. 8, the frequency of the RF signal to be transmitted is varied in accordance with a predefined algorithm that is known by both the transmitter 120 and receiver 150. Accordingly, at any given moment in time, both the transmitter 120 and receiver 150 know the frequency of the transmitted signal. The read address to memory 135 in such embodiments is determined in accordance with the predefined algorithm.

Figure 9:
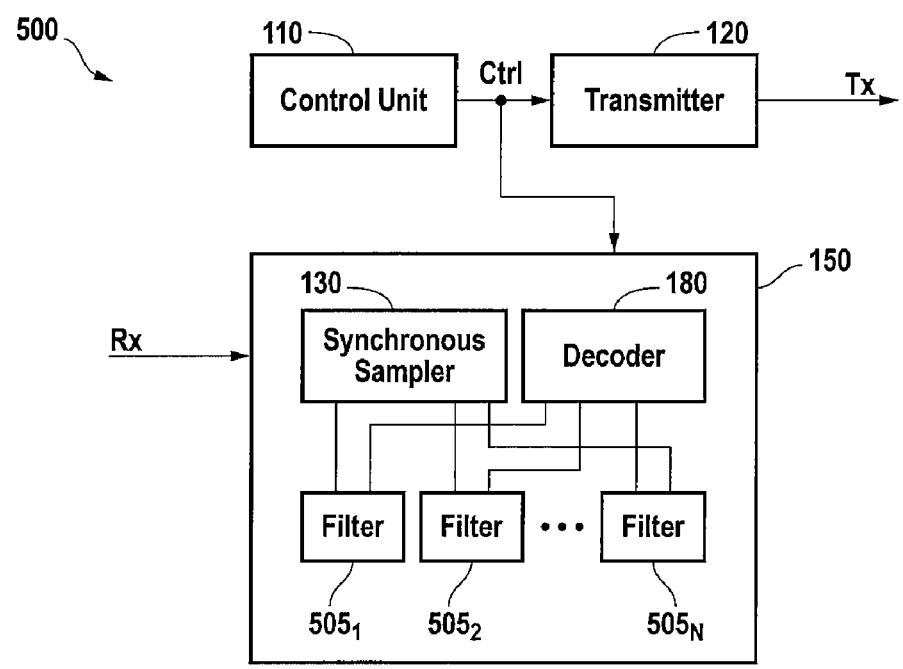
FIG. 9 shows a transmitter/receiver system, in accordance with another embodiment of the present invention.

FIG. 9 shows a system 500, in accordance with another exemplary embodiment of the present invention. Receiver 150 is shown as including, in part, a synchronous sampler 130, a decoder 180 and N analog filters $505_1, \ldots, 505_N$, each having a different center frequency. Signal Ctrl generated by control unit 110 is used to modulate the frequency of the RF signal Tx transmitted by transmitter 120. Signal Ctrl is also used to by decoder 180 select a different one of the filters $505_1, \ldots, 505_N$ at any given time. Therefore, as signal Ctrl is varied to shift the frequency of the transmitted signal, one of the filters $505_1, \ldots, 505_N$ is selected by decoder 180 in accordance with the new value of signal Ctrl to filter out the unwanted noise.

Figure 10:
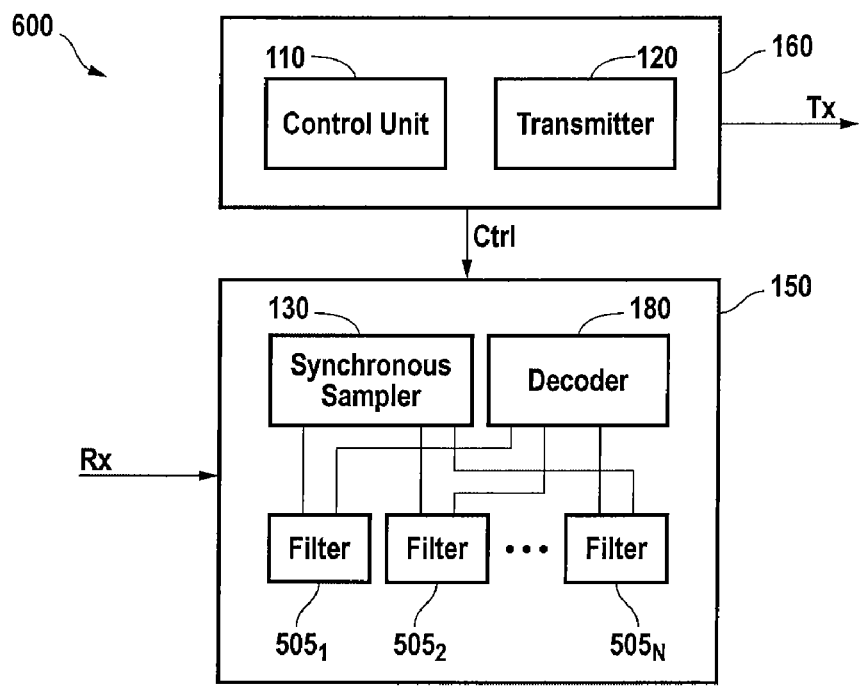
FIG. 10 shows a transmitter/receiver system, in accordance with another embodiment of the present invention.

FIG. 10 shows a system 600, in accordance with another exemplary embodiment of the present invention. System 600 is similar to system 500 except that in system 600, control unit 110 and transmitter 120 are disposed in the same block 160. Signal Ctrl generated within block 160 is used to modulate the frequency of the RF transmitted signal Tx. Signal Ctrl is also used by decoder 180 to select a different one of filters 505 to filter out the unwanted noise.

Figure 11:
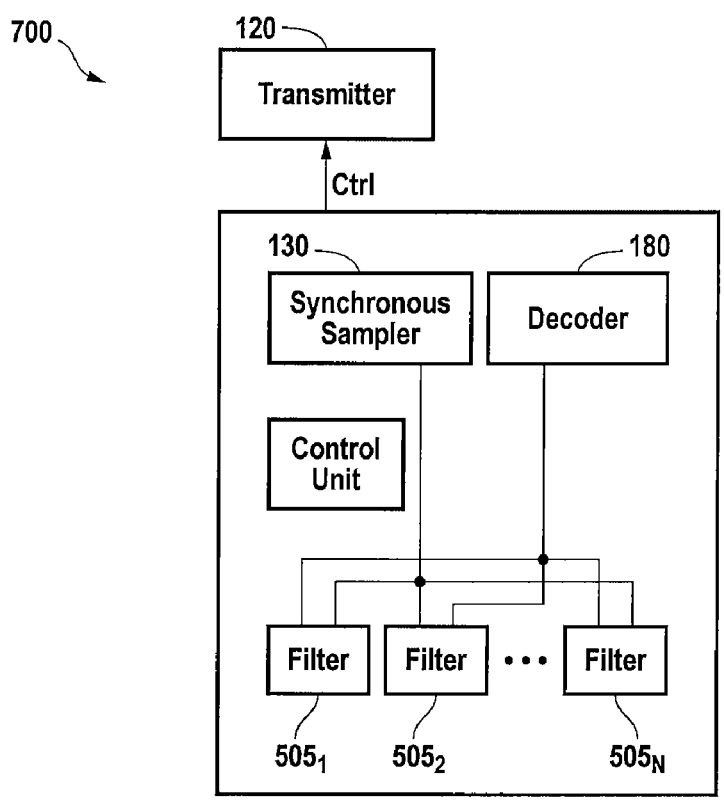
FIG. 11 shows a transmitter/receiver system, in accordance with another embodiment of the present invention.

FIG. 11 shows a system 700, in accordance with another exemplary embodiment of the present invention. System 700 is similar to system 500 except that in system 500, control unit 110 is disposed in the receiver 150. Signal Ctrl generated by control unit 120 is used by transmitter 120 to modulate the frequency of the RF transmitted signal Tx. Signal Ctrl is used also used by decoder 180 to select a different one of filters 505 to filter out the unwanted noise.

The above embodiments of the present invention are illustrative and not limiting. Various alternatives and equivalents are possible. The invention is not limited by the type of modulation, digital-to-analog conversions, filter, memory, and the like. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is;

1. An apparatus comprising:
   a sampler configured to downconvert a received RF signal to an analog audio signal;
   an analog-to-digital converter configured to convert the analog audio signal to a digital audio signal;
   a memory having stored therein a plurality of filter coefficients each associated with a different RF signal transmission frequency; and
   a filter configured to filter out noise components present in the digital audio signal using one or more of the filter coefficients stored in the memory, wherein said filter coefficients are selected in accordance with a frequency shifting algorithm defining an amount of shift in frequency of an associated transmitted RF signal.

2. The apparatus of claim 1 wherein an amount of shift in frequency on the associated transmitted RF signal is determined by periodically turning off a transmitter transmitting the associated RF signal.

3. The apparatus of claim 1 wherein said a receiving unit is disposed in a device in which a transmitting unit is also disposed.

4. The apparatus of claim 1 wherein said filter is a bandpass filter.

5. The apparatus of claim 1 wherein said memory is selected from a group consisting of dynamic random access memory, and non-volatile random access memory.

6. A method of filtering comprising:
   downconverting a received RF signal to an analog audio signal;
   converting the analog audio signal to a digital audio signal;
   varying a frequency characteristics of a filter in accordance with a plurality of stored filter coefficients to filter out noise components present in the converted digital audio signal; and
   varying said filter coefficients in response to a frequency shifting algorithm.

7. The method of claim 6 further comprising:
   turning off a transmitter periodically to determine an amount of shift in frequency of an associated transmitted RF signal.

8. The method of claim 6 further comprising:
   disposing a receiving unit in a device in which a transmitting unit is also disposed.

9. The method of claim 6 wherein said filter is a bandpass filter.

10. The method of claim 6 wherein said filter coefficients are stored in a memory selected from a group consisting of dynamic random access memory, and non-volatile random access memory.

11. An apparatus comprising:
    a sampler configured to downconvert a received RF signal to an analog audio signal;
    a memory having stored therein a plurality of digitization rates each associated with a different RF signal transmission frequency;
    an analog-to-digital converter configured to convert the analog audio signal to a digital audio signal using one or more of the plurality of digitization rates stored in the memory; and
    a filter configured to filter out noise components present in the digitized audio signal, wherein said digitization rates are selected in accordance with a frequency shifting algorithm defining an amount of shift in frequency of an associated transmitted RF signal.

12. The apparatus of claim 11 wherein an amount of shift in frequency on the associated transmitted RF signal is determined by periodically turning off a transmitter transmitting the associated RF signal.

13. The apparatus of claim 11 wherein a receiving unit is disposed in a device in which a transmitting unit is also disposed.

14. The apparatus of claim 11 wherein said filter is a bandpass filter.

15. The apparatus of claim 11 wherein said memory is selected from a group consisting of dynamic random access memory, and non-volatile random access memory.

16. A method of filtering comprising:
    downconverting a received RF signal to an analog audio signal;
    varying digitization rates of said analog audio signal in accordance with one of a plurality of stored digitization rates in response to a frequency shifting algorithm; and
    filtering out noise components present in the digitized audio signal.

17. The method of claim 16 further comprising:
    turning off a transmitter periodically to determine an amount of shift in frequency of an associated transmitted RF signal.

18. The method of claim 16 further comprising:
    disposing a receiving unit in a device in which a transmitting unit is also disposed.

19. The method of claim 16 wherein said filtering is through a bandpass filter.

20. The method of claim 16 wherein said digitization rates are stored in a memory selected from a group consisting of dynamic random access memory, and non-volatile random access memory.

21. An apparatus comprising:
    a sampler configured to downconvert a received RF signal to an analog audio signal;
    a plurality of filters, each filter characterized by a different center frequency; and
    a decoder responsive to a control signal to select one of the plurality of filters to filter out noise components present in the analog audio signal;
    wherein said control signal is varied in accordance with a frequency shifting algorithm defining an amount of shift in frequency of an associated transmitted RF signal.

22. The apparatus of claim 21 wherein a receiving unit is disposed in a device in which a transmitting unit is also disposed.

23. The apparatus of claim 21 wherein said filters include bandpass filters.

24. An apparatus comprising:
a sampler configured to downconvert a received RF signal to an analog audio signal;
a plurality of filters, each filter characterized by a different center frequency; and
a decoder responsive to a control signal to select one of the plurality of filters to filter out noise components present in the analog audio signal;
wherein said control signal is varied in accordance with information obtained by periodically turning off a transmitter transmitting an associated RF signal, the variation in the control signal being representative of an amount of shift in frequency of the associated transmitted RF signal.

25. A method comprising:
downconverting a received RF signal to an analog audio signal;
selecting one of the plurality of filters in accordance with a frequency shifting algorithm defining an amount of shift in frequency of an associated transmitted RF signal, each of said filters being characterized by a different center frequency; and
filtering out noise components present in the analog audio signal using the selected filter.

26. The method of claim 25 further comprising:
disposing said receiving unit is disposed in a device in which a transmitting unit is also disposed.

27. The method of claim 25 wherein said filters are bandpass filters.

28. A method comprising:
downconverting a received RF signal to an analog audio signal;
selecting one of the plurality of filters in accordance with information obtained by periodically turning off a transmitter transmitting an associated RF signal, the information being representative of an amount of shift in frequency of the associated transmitted RF signal; and
filtering out noise components present in the analog audio signal using the selected filter.

* * * * *